United States Patent
Yang et al.

(10) Patent No.: US 9,552,668 B2
(45) Date of Patent: Jan. 24, 2017

(54) GENERATION OF A THREE-DIMENSIONAL REPRESENTATION OF A USER

(71) Applicant: Microsoft Corporation, Redmond, WA (US)

(72) Inventors: Fan Yang, Beijing (CN); Minmin Gong, Beijing (CN); Zicheng Liu, Redmond, WA (US); Xin Tong, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/711,639

(22) Filed: Dec. 12, 2012

(65) Prior Publication Data

US 2014/0160123 A1 Jun. 12, 2014

(51) Int. Cl.
*G06T 17/00* (2006.01)

(52) U.S. Cl.
CPC .................................... *G06T 17/00* (2013.01)

(58) Field of Classification Search
CPC ............ G06K 9/00221; G06K 9/00228; G06K 9/00234; G06K 9/00241; G06K 9/00248; G06K 9/00255; G06K 9/00261; G06K 9/00268; G06K 9/00275; G06K 9/00281; G06T 17/00

See application file for complete search history.

(56) References Cited

U.S. PATENT DOCUMENTS

| 7,835,568 | B2 | 11/2010 | Park et al. | |
|---|---|---|---|---|
| 8,730,231 | B2 * | 5/2014 | Snoddy et al. | 345/419 |
| 2009/0310828 | A1 | 12/2009 | Kakadiaris et al. | |
| 2010/0302138 | A1 | 12/2010 | Poot et al. | |
| 2012/0293635 | A1 * | 11/2012 | Sharma | G06K 9/00234 348/50 |
| 2012/0299912 | A1 | 11/2012 | Kapur et al. | |

OTHER PUBLICATIONS

Blanz, Volker, Kristina Scherbaum, and H-P. Seidel. "Fitting a morphable model to 3D scans of faces." Computer Vision, 2007. ICCV 2007. IEEE 11th International Conference on. IEEE, 2007.*
Chin, Seongah, and Kyoung-Yun Kim. "Expressive 3D face for mobile devices." Consumer Electronics, IEEE Transactions on 54.3 (2008): 1294-1302.*
Tong, Jing, et al. "Scanning 3d full human bodies using kinects." Visualization and Computer Graphics, IEEE Transactions on 18.4 (Apr. 2012): 643-650.*
Zollhofer, et al., "Automatic Reconstruction of Personalized Avatars From 3D Face Scans", In Journal of Computer Animation and Virtual Worlds, vol. 22, Issue 2-3, Apr. 1, 2011, pp. 195-202.*

(Continued)

*Primary Examiner* — Jacinta M Crawford
*Assistant Examiner* — Diane Wills
(74) *Attorney, Agent, or Firm* — Sandy Swain; Micky Minhas (57) ABSTRACT

Described herein are technologies pertaining to generating a relatively accurate virtual three-dimensional model of a head/face of a user. Depth frames are received from a depth sensor and color frames are received from a camera, wherein such frames capture a head of a user. Based upon the depth frames and the color frames, the three-dimensional model of the head of the user is generated.

20 Claims, 6 Drawing Sheets

(56) References Cited

OTHER PUBLICATIONS

Allen, Brett, Brian Curless, and Zoran Popović. "The space of human body shapes: reconstruction and parameterization from range scans." ACM Transactions on Graphics (TOG). vol. 22. No. 3. ACM, 2003.*

Berger, Kai et al. "Markerless Motion Capture using multiple Color-Depth Sensors", Vision, Modeling, and Visualization, The Eurographics Association, 2011.*

Endres, Felix et al. "An Evaluation of the RGB-D SLAM System", 2012 IEEE International Conference on Robotics and Automation, IEEE, May 2012.*

"International Search Report & Written Opinion for PCT Patent Application No. PCT/US2013/074807", Mailed Date: May 22, 2014, Filed Date: Dec. 12, 2013, 16 Pages.

Bowyer, et al., "A Survey of Approaches and Challenges in 3D and Multi-Modal 3D+2D Face Recognition", In Journal of Computer Vision and Image Understanding, vol. 101, Issue 1, Jan. 1, 2006, pp. 1-15.

Tsalakanidou, et al., "Use of Depth and Colour Eigenfaces for Face Recognition", In Journal of Pattern Recognition Letters, vol. 24, Issue 9-10, Jun. 1, 2003, pp. 1427-1435.

Zhao, et al., "Chapter 4—3D Morphable Face Model, A Unified Approach for Analysis and Synthesis of Images", In Book—Face Processing: Advanced Modeling and Methods, Jan. 1, 2006, pp. 127-158.

Baltrusaitis, et al., "3D Constrained Local Model for Rigid and Non-Rigid Facial Tracking", In IEEE Conference on Computer Vision and Pattern Recognition, Jun. 16, 2012, pp. 2610-2617.

Aitpayev, et al., "Creation of 3D Human Avatar using Kinect", Retrieved at <<http://www.asian-transactions.org/Journals/Vol01Issue06/ATFECM/ATFECM-30120064.pdf>>, Asian Transactions on Fundamentals of Electronics, Communication & Multimedia (ATFECM), vol. 01, Issue 05, Jan. 2012, pp. 1-3.

Almeida, et al., "On-Line 3D Body Modelling for Augmented Reality", Retrieved at <<http://mail.isr.uc.pt/~mrl/admin/upload/GRAPP_2012_88_CR.pdf>>, GRAPP 2012—International Conference on Computer Graphics Theory and Applications, Feb. 24, 2012, pp. 1-8.

Ogi, et al., "Avatar Communication: Virtual Instructor in the Demonstration Exhibit", Retrieved at <<http://lab.sdm.keio.ac.jp/ogi/papers/HCII2003paper.pdf>>, Proceedings of HCI International, Aug. 28, 2012, pp. 1-5.

Izadi, et al., "KinectFusion: Real-time 3D Reconstruction and Interaction Using a Moving Depth Camera", Retrieved at <<http://events.ccc.de/congress/2011/Fahrplan/attachments/1969_kinectfusion-uist-comp.pdf>>, 24th annual ACM symposium on User interface software and technology, Oct. 16, 2011, pp. 1-10.

Cho, et al., "A 3D avatar modeling of real world objects using a depth camera", Retrieved at <<http://ieeexplore.ieee.org/stamp/stamp.jsp?tp=&arnumber=5069655>>, 3DTV Conference: The True Vision—Capture, Transmission and Display of 3D Video, May 4, 2009, pp. 1-4.

"Written Opinion for PCT Patent Application No. PCT/US2013/074807", Mailed Date: Mar. 5, 2015, 8 pages.

"Response to the Written Opinion of the International Search Report (ISR) for PCT Patent Application No. PCT/US2013/074807", Filed Date: Sep. 18, 2014, 7 pages.

"International Preliminary Report on Patentability for PCT Patent Application No. PCT/US2013/074807", Mailing Date: May 12, 2015, 13 pages.

* cited by examiner

GENERATION OF A THREE-DIMENSIONAL REPRESENTATION OF A USER

BACKGROUND

Relatively recently, people have been utilizing digital avatars to represent themselves in a computer-setting. Creation of a digital avatar is typically accomplished through utilization of online libraries of features, where a user can select from a plurality of different features to generate an avatar that is generally representative of the user. For instance, the user may select a certain head shape, a certain skin color, eyebrows of a predefined shape, etc. in connection with generating a virtualized representation of the user. This process is relatively time-consuming, and often results in creation of an avatar that is not representative of the actual appearance of the individual.

Systems have been developed to automatically generate virtualized three-dimensional representations of users. These systems, however, suffer from being inaccurate, complex, and/or expensive. For example, a system has been developed that uses a red-blue-green (RGB) video stream to generate a virtual three-dimensional model of a face of a user. The user is asked to rotate his or her head in front of a camera, and the virtual three-dimensional model of the face of the user is generated based upon the video. Such a system, however, suffers from relatively poor quality, in that it is unable to capture nuanced depths found in human faces.

Another exemplary system utilizes several laser measurement units in connection with obtaining a relatively dense cloud of points that is used in connection with generating a virtual three-dimensional representation of a face of a user. Laser measurement units, however, are relatively expensive. Accordingly, such a system is not suitable for use by ordinary consumers. Moreover, such a system is not readily ported to another location, and lacks underlying technology to allow the resulting point cloud to be transformed into an animatable avatar.

SUMMARY

The following is a brief summary of subject matter that is described in greater detail herein. This summary is not intended to be limiting as to the scope of the claims.

Described herein are various technologies pertaining to utilizing a commodity RGB camera and depth sensor to generate, in a semi-autonomous manner, a relatively accurate virtual three-dimensional model of a head/face of a user. Such three-dimensional model, in an exemplary embodiment, can be employed as a virtualized representation of the individual, which can identify such individual in an online/gaming environment. The three-dimensional model can relatively accurately represent a shape of a head of the user, a size of the head of the user, coloring of skin of the user, and facial features of the user, including eyes, nose, ears, cheek lines, mouth, etc.

To generate a relatively accurate model of a head/face of a user, a plurality of RGB frames are received from a color camera over a range of time, and a plurality of depth frames are received from a depth sensor over the range of time. Both the camera and the depth sensor are configured to capture images of the head/face of the user. The RGB frames are subjected to a face tracking algorithm to identify features in the face captured in the RGB frames. Such features can include, but are not limited to, centers of the eyes of the user, center of the nose of the user, and nasal alars of the user. A point cloud can be generated based upon the depth frames and the features identified in the RGB frames, wherein the features in the RGB frames are mapped to depth frames to locate their positions in three-dimensional space, and are subsequently used to align depth frames. Points in the point cloud are representative of respective distances of the head/face of the user from the depth sensor at such points.

Subsequently, a pre-existing model of a human head shape can be morphed to fit the three-dimensional point cloud (labeled with the facial features) to represent the shape of the head/face of the user. Texture can be applied to such three-dimensional model to cause the virtual three-dimensional model to accurately represent the user. De-noising and skin estimation techniques can be applied over RGB frames in connection with providing aesthetically pleasing texture to the virtual three-dimensional model of the head/face of the user. For example, techniques such as automatic exposure adjustment and automatic noise reduction with respect to the RGB frames can be utilized to texturize the three-dimensional model of the head/face of the user. A texture map generated from the RGB frames can then be mapped to the three-dimensional model, such that features of the face and color are appropriately aligned on the three-dimensional model.

The above described technologies can be employed utilizing commodity sensor units. For example, such a sensor unit may be a periphery device that can be coupled to a computing device, such as a gaming console. In another example, the sensor unit can be included in a computing device, such as a desktop computing device, a tablet computing device, or a portable telephone. Accordingly, for example, resolution of the camera and/or resolution of the depth sensor can be relatively low. Utilizing the techniques described herein, however, a relatively accurate virtual three-dimensional representation of the head/face of a user can be generated.

Other aspects will be appreciated upon reading and understanding the attached figures and description.

DETAILED DESCRIPTION

Various technologies pertaining to constructing a virtual three-dimensional head/face of a user will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Figure 1:
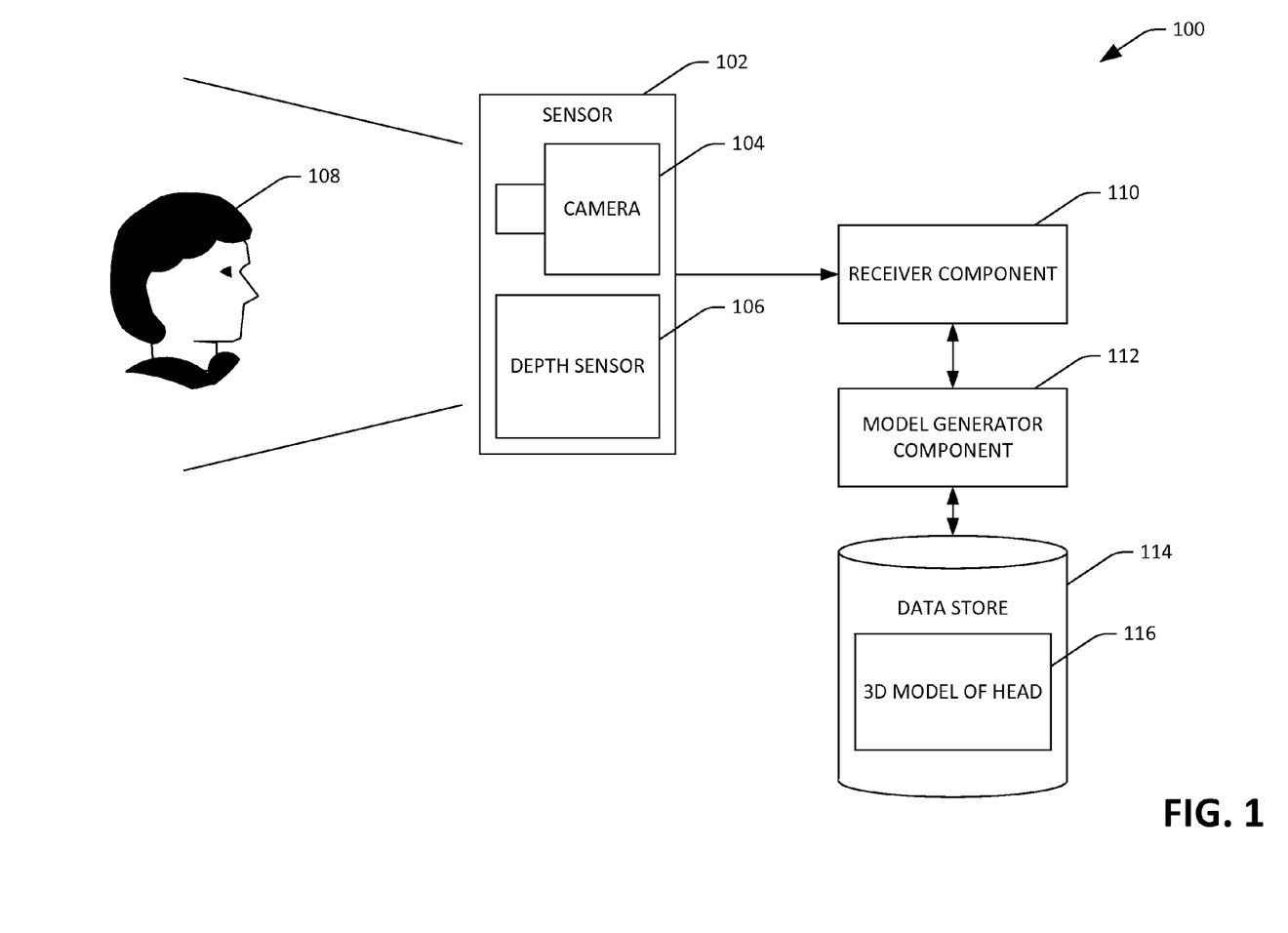
FIG. 1 is a functional block diagram of an exemplary system that facilitates generating a relatively accurate virtual three-dimensional model of a head/face of a user.

With reference now to FIG. 1, an exemplary system 100 that facilitates constructing a relatively accurate virtual three-dimensional model of a head/face of a user is illustrated. The system 100 comprises a sensor unit 102, which includes a camera 104 that captures color (RGB) images and a depth sensor 106 that captures depth images. In an exemplary embodiment, resolution of images captured by the camera 104 can be relatively low; such as, for example, less than or equal to 1280 pixels by 960 pixels. For instance, the resolution of images captured by the camera 104 can be 640 pixels by 480 pixels. Similarly, resolution of depth images generated by the depth sensor 106 can be relatively low; such as, for example, less than or equal to 1280 pixels by 960 pixels. In another example, resolution of depth images generated by the depth sensor 106 can be 640 pixels by 480 pixels. In the example shown in FIG. 1, the camera 104 and the depth sensor 106 are housed in the sensor unit 102. It is to be understood, however, that the camera 104 and the depth sensor 106 may be included in separate housings. Furthermore, the sensor unit 102 may be included in a periphery device that can be coupled to a computing device, such as a sensor that is coupled to a gaming console. In another exemplary embodiment, the sensor unit 102 may be included in a computing device, such as a personal computing device, a laptop computing device, a mobile telephone, a tablet computing device, or the like. Accordingly, for example, the camera 104 may be a web cam. Additionally, the depth sensor 106 may utilize any suitable technology in connection with generating depth images. For instance, the depth sensor 106 may utilize an infrared-based depth sensing system, a time of flight depth sensing system, or other suitable depth sensing technology.

As shown in FIG. 1, the camera 104 and the depth the sensor 106 are aligned to capture RGB images and depth images, respectively, of a head/face of a user 108. For example, the resolution corresponding to the head/face of the user 108 in images captured by the camera 104 can be as low as 50 pixels by 50 pixels. Similarly, resolution of the head/face of the user 108 in images captured by the depth sensor 106 can be as low as 100×100 pixels. Accordingly, it can be understood that the sensor unit 102 may be a commodity sensor unit, such that the camera 104 and the depth sensor 106 can be relatively inexpensive, portable, and adaptable to different environments of the user 108.

The system 100 comprises a receiver component 112 that receives a plurality of RGB images/frames captured by the camera 104 over a range of time. Each RGB image/frame in the plurality of RGB images/frames comprises an image of the head/face of the user 108. The receiver component 110 also receives a plurality of depth images/frames captured by the depth sensor 106 over the range of time. Similar to the RGB images/frames, each depth image/frame in the plurality of depth images/frames comprises a depth map corresponding to the head/face of the user 108. In an exemplary embodiment, the camera 104 and the depth sensor 106 may be in communication with a common clock, such that the depth camera 104 and the depth sensor 106 are synchronized in time with respect to one another. Accordingly, each RGB image/frame generated by the camera 104 is aligned in time with a respective depth image/frame generated by the depth sensor 106. In another exemplary embodiment, the receiver component 110 can be configured to synchronize, in time, RGB frames output by the camera 104 with depth frames output by the depth sensor 106.

A model generator component 112 is in communication with the receiver component 110 and receives the RGB images captured by the camera 104 and the depth images captured by the depth sensor 106 synchronized. As will be described in greater detail below, the model generator component 112 is configured to generate a relatively accurate virtual three-dimensional model of the head/face of the user 108 based at least in part upon the RGB frames output by the camera 104 and the depth frames output by the depth sensor 106. The system 100 comprises a data store 114 that can retain a virtual three-dimensional model 116 of the head/face of the user 108 generated by the model generator component 112. The three-dimensional model 116 may be utilized in a variety of settings where it is desirable to virtualize the head/face of the user 108. For example, the three-dimensional model 116 can be employed to represent the user 108 in an online environment, such as an online gaming environment. That is, the three-dimensional model 116 can be employed as an avatar for the user 108. Additionally, the three-dimensional model 116 can be animatable. For example, the three-dimensional model 116 can be employed to map to user expressions, which uses features identified in RGB frames as a guideline. In another example, the three-dimensional model 116 can be animated using pre-defined expressions. In such an exemplary embodiment, the knowledge of feature location in the three-dimensional model 116 can be employed when animating the three-dimensional model.

Briefly, the model generator component 112 can generate the three-dimensional model 116 based upon RGB frames output by the camera 104 and depth frames output by the depth sensor 106 when the head/face of the user 108 is in a variety of different possible positions relative to the sensor unit 102. In a first exemplary embodiment, the user 108 can initially orient her head relative to the sensor unit 102 at an offset of approximately 20° to the left (from the perspective of the user). When the head of the user 108 is positioned as such, the camera 104 and the depth sensor 106 can capture a plurality of RGB images and a plurality of depth images (approximately 40), respectively, of the head/face of the user 108. Subsequently, the user 108 can look directly at the sensor unit 102. When the head/face of the user 108 is oriented in such manner, approximately 40 RGB images and 40 depth images can be captured by the camera 104 and the depth sensor 106, respectively. Thereafter, the user can orient her head at an offset of approximately 20° to the right relative to the sensor unit 102 (from the perspective of the user), and again approximately 40 RGB images and 40 depth images can be captured by the camera 104 and depth sensor, respectively. The receiver component 110 can receive such images corresponding to the different orientations of the head/face of the user 108 relative to the sensor unit 102, and the model generator component 112 can construct the three-dimensional model 116 of the head/face of the user 108 based upon such RGB images and depth images.

In another example, the user 108 can be instructed to initially orient her head/face at an approximately 20° angle to the left relative to the sensor unit 102, and then slowly, and in a continuous manner, turned her face towards the sensor unit 102 and continue until her face is oriented at an offset of 20° to the right relative to the sensor unit 102. That is, the user 108 rotates her head/face from left to right relatively slowly in front of the sensor unit 102, such that both the camera 104 and the depth sensor 106 can capture approximately 100 RGB images and depth images, respectively. The receiver component 110 can receive such frames and the model generator component 112 can construct the three-dimensional model 116 of the face/head of the user 108 based upon these RGB images and depth images.

In yet another exemplary embodiment, the user 108 can look directly at the sensor unit 102, and RGB images and depth images can be captured based solely upon such images. It is to be understood that capturing RGB images and depth images using a single position of the head/face of the user 108 relative to the sensor unit 102 may result in a decrease in accuracy in the resultant three-dimensional model 116 of the head/face of the user 108.

The model generator component 112, as will be described in greater detail below, can perform a variety of actions on RGB images and depth images generated by the sensor unit 102 in connection with generating the three-dimensional model 116 of the head/face of the user 108. As mentioned above, since the depth sensor 106 may generate relatively noisy depth images (also referred to as depth maps), the model generator component 112 can be configured to align depth images that are to be used in connection with generating the three-dimensional model 116 of the head/face of the user 108. Additionally, the RGB images generated by the camera 104 can be analyzed for features of the face/head of the user 108 therein. These features can include, for example, centers of the eyes of the user 108, center of the nose of the user 108, left and right alars of the nose of the user 108, amongst other features. For each RGB image/depth image pair, feature locations can be mapped from a RGB image to a respective depth image, and feature locations in depth images can be utilized to align depth images with respect to one another. This can result in the generation of a three-dimensional point cloud, which can be employed by the model generator component 112 to generate the three-dimensional model 116 of the head/face of the user 108. The three-dimensional point cloud is in turn employed to morph an existing three-dimensional mesh to construct a mesh that relatively accurately reflects the shape of the head/face in three dimensions.

Additionally, the model generator component 112 can texturize the three-dimensional mesh of the head/face of the user 108 based at least in part upon the RGB images and mapping of identified texture in the RGB images to the three-dimensional mesh of the head/face of the user 108. For example, in the exemplary embodiment where three separate sets of RGB images and depth images are generated by the camera 104 and the depth sensor 106, respectively, when the head/face of the user 108 is oriented in three different positions relative to the sensor unit 102, texture in RGB images in the three sets can be blended and mapped to the three-dimensional mesh such that features identified in the RGB images are appropriately aligned with the three-dimensional wire mesh, and appropriate color is applied to the three-dimensional wire mesh. The texture quality can be improved via automatic exposure adjustment and noise reduction prior to the three-dimensional mesh of the head/face of the user 108 being texturized. Further, skin color of the user 108 can be estimated based upon RGB images, and face texture can be synthesized for portions of the head/face not captured in RGB images to provide a consistent look to the resultant three-dimensional model 116 retained in the data store 114.

Again, the three-dimensional model 116 of the head/face of the user 108 can be employed in any setting where it may be desirable to virtually represent the user 108. Such scenarios include online gaming environments, off-line gaming environments, as an avatar for communications, such as in an instant messaging application, augmented reality settings, virtualized exercise or physical therapy programs, or the like.

Figure 2:
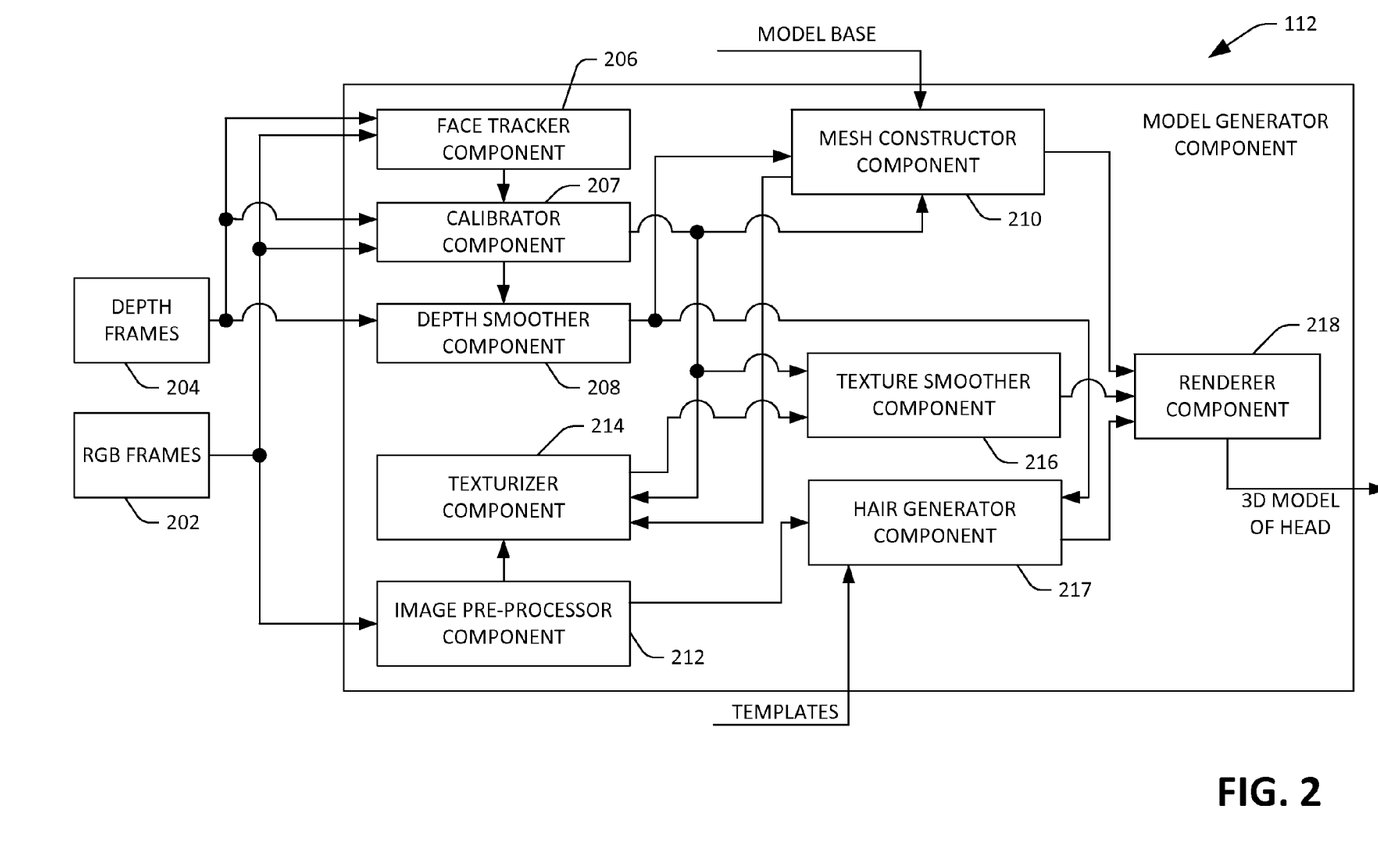
FIG. 2 is a functional block diagram of a model generator component that is employed in connection with generating a relatively accurate virtual three-dimensional model of a head/face of a user.

With reference now to FIG. 2, an exemplary depiction of the model generator component 112 is illustrated. As described above, the model generator component 112 receives RGB frames 202 from the camera 104 as well as depth frames 204 from the depth sensor 106. Each RGB frame in the RGB frames 202 can be synchronized in time with a respective depth frame from the depth frames 204. The model generator component 112 includes a face tracker component 206 that receives the RGB frames 202 and, optionally, the depth frames 204. The face tracker component 206 identifies certain features in each RGB frame, wherein such features include, but are not limited to, centers of the eyes of the user 108, center of the nose of the user 108, left and right nasal alars of the user 108, etc. Based upon the identification of such features, the face tracker component 206, for each RGB frame, can estimate a pose of the user 108 (e.g., a position of the head/face of the user 108 relative to the sensor unit 102). The face tracker component 206 can optionally use depth frames to improve feature recognition accuracy. The output of the face tracker component 206 can be locations of identified features in the RGB frames and an estimate of a pose of the user 108 in each RGB frame.

The model generator component 112 also comprises a calibrator component 207 that receives locations of features in the RGB frames 202 output by the face tracker component 206, as well as the RGB frames 202 and the depth frames 204, and identifies positions of features in a three-dimensional coordinate system via mapping features identified in a RGB frame to a corresponding depth frame (or mapping the corresponding depth frame to the RGB frame).

In an exemplary embodiment, the sensor unit 102 may natively support mapping depth frames to RGB frames, but may not support mapping points in an RGB frame to a depth frame. Accordingly, to determine position of each feature in each frame in a three-dimensional coordinate system, the calibrator component 207, for each depth frame, can generate triangles based on depth coordinates of the respective depth frame. The calibrator component 207 can map each triangle from the depth frame to its corresponding RGB frame. The calibrator component 207 can then, for each identified feature in the RGB frame, identify the triangle from the depth frame to which a respective feature belongs. Subsequently, the calibrator component 207 can compute a distance to each triangle vertex from the identified feature point. Based upon such distances, a three-dimensional coordinate point can be computed by the calibrator component 207 for each feature via interpolation of distances from the triangle vertices.

To reduce computational complexity, the calibrator component 207, when identifying a triangle to which an identified feature belongs, can first locate a vertex that is most proximate to the identified feature. It can be inferred that the identified feature belongs to a triangle that has such vertex. Accordingly, the output of the calibrator component 207 can be coordinates in a three-dimensional coordinate system of each identified feature in each RGB frame.

The model generator component 112 additionally comprises a depth smoother component 208 that is employed to accumulate depth data and generate a three-dimensional point cloud. The depth smoother component 208 receives the depth frames 204 as well as the features identified in each RGB frame by the face tracker component 206 and their respective positions in three-dimensional space.

The depth smoother component 208 accumulates depth data based at least in part upon the coordinates in three-dimensional space computed by the calibrator component 207. More specifically, in an exemplary embodiment, the depth smoother component 208 can accumulate depth data by aligning the depth frames 204. To perform frame alignment, the depth smoother component 208 can utilize an interactive closest point (ICP) algorithm. Normal information for each point in each depth frame is employed by the depth smoother component 208 to obtain relatively accurate depth data. The depth smoother component 208 can employ two-directional mapping when creating correspondence between two depth frames to ensure that border points are dropped.

Also, the depth smoother component 208 can utilize the facial feature coordinates output by the calibrator component 207 to calculate a rough rigid transformation between two depth frames. Such rigid transformation can be used as an initial value for the aforementioned ICP algorithm. The feature points utilized for the rough rigid transformation can be eye centers, nose centers, and two nasal alar.

With more particularity, the depth frames 204 include a first depth frame, and a cubic coordinate system can be established based on the position of the head of the user 108 in the first depth frame. The first frame can be aligned with a second frame (captured temporally immediately after the first frame) to create an accumulation result. Each subsequent frame can be aligned with a current accumulation result first, and thereafter the converted points can be mapped to such cubic accumulation coordinate system and counted to nearby pixels with distance weight. Subsequent to accumulation being undertaken over all of the depth frames for a particular pose to generate an accumulated result, the depth smoother component 208 can utilize another ICP algorithm to map the accumulated result with the initial depth frame, which can reduce errors being propagated during the accumulation process.

As mentioned above, in an exemplary embodiment, three separate sets of frames can be captured for three different positions of the head of the user 108. Frames from the three separate views can be accumulated by the depth smoother component 208 separately. Subsequently, the three accumulated results can be aligned and then combined through utilization of alpha blending. The alpha blend band can be on the outside of the eyes and mouth of the user 108, which ensures that facial features are all from the frontal view, which has highest accuracy. The accumulated depth data can be referred to as a three-dimensional point cloud.

The model generator component 112 additionally comprises a mesh constructor component 210 which receives the three-dimensional point cloud output by the depth smoother component 208 as well as three-dimensional feature locations output by the calibrator component 207 for each RGB frame. Additionally, the mesh constructor component 210 receives a model base which can be a collection of three-dimensional face shape samples. The mesh constructor component 210, utilizing such input, generates a relatively accurate three-dimensional wire mesh of the head/face of the user 108. The mesh constructor component 210 can construct a principal component analysis (PCA) model of the head/face of the user 108, wherein such model refers to a target model being expressed as a linear combination of orthogonal shape vectors plus a mean model. Such shape vectors and mean model can be calculated offline from a collection of three-dimensional face shape samples. Specifically, predefined three-dimensional face shape samples which have same geometric topology can be employed to compute a PCA basis and a mean model.

The mesh constructor component 210 can align the PCA mean model with the accumulated depth data output by the depth smoother component 208. The mesh constructor component 210 can undertake a rough rigid transformation between the PCA mean model and the accumulation depth data, which can be used to convert the PCA basis to depth space. Utilizing the feature points received from the calibrator component 207, the mesh constructor component 210 can perform a transform matrix calculation. The PCA mean model can already have such feature points calculated therein.

With more particularity regarding the three-dimensional wire mesh output by the mesh constructor component 210, such mesh can be a three-dimensional triangulated mesh. A shape vector is denoted as $S=(v_1^t, \ldots, v_n^t)$, where $v_i=(x_i, y_i, z_i)^t$ are the three-dimensional coordinates of the ith vertex. The deformation of a three-dimensional face can be described by the linear PCA as follows:

$$S = \mu + \Sigma_{i=1}^k \alpha_i \varnothing_i, \quad (1)$$

where $\mu$ represents the average shape from training samples (the three-dimensional face shape samples mentioned above), $\varnothing_i$ are orthogonal shape vectors, $\alpha_i$ are scalar values indicating the contributions of the shape deformation from the ith shape vector, and k is the total number of shape vectors. Shape vectors can be sorted in order by importance as determined by their corresponding eigenvalues $\sigma_i$.

For a relatively simple three-dimensional morphable model reconstruction, the mesh constructor component 210 can estimate $\alpha_i$ to achieve the following:

$$E(\alpha) = \min_\alpha (\Sigma(\|\mu + \Sigma_{i=1}^k \alpha_i \varnothing_i - S'\|^2)), \quad (2)$$

for which S' is the depth accumulation data (the three-dimensional point cloud) that the target PCA model needs to fit. Specifically, since S' may not have information from the ear of the user 108 to the back of the head of the user 108, and data on the forehead may have interference due to existence of hair of the user 108, a mask can be manually generated to select vertices to perform reconstruction. The mask range, presented below, includes major facial features, as well as cheeks of most humans.

$v_j = (x_j, y_j, z_j)^t$ defines selected vertices used for a mask constraint, where $j \in (1, 2, \ldots, n)$, and the corresponding shape vector is $S_F = (v_1^t, \ldots, v_n^t)$, which is a collection of $v_j$. Given such constraints, the PCA fitting goal can be modified to be as follows:

$$E(\alpha) = \min_\alpha (\Sigma(\|S_F - S'\|^2) + \rho \Sigma_{i=1}^k \alpha_i / \sigma_i) \quad (3)$$

The second portion of Eq. (4) is the regularization constraint. As mentioned above, $\sigma_i$ is the eigenvalue, which is used to ensure that other vectors (deemed to be less important) have a relatively smaller $\alpha_i$ compared with more important vectors to avoid creation of a strange shape.

A variety of techniques can be employed by the mesh constructor component 210 to identify correspondence points in S' for each $v_j$, where j∈(1, 2, ..., n). The mesh constructor component 210 can cluster vertices on the constraint mask into several regions, wherein the regions are based upon identified facial feature definitions (mouth, eyes, nose, cheeks, etc.). Again, different techniques can be used to find correspondence points on the input three-dimensional point cloud for the different regions. For instance, for vertex on the PCA model, a nearest point on a plane of the accumulated point cloud can be located, and a normal value for the source/destination point can be compared with such point on the plane to reject point pairs whose angles between source/destination normal are larger than a pre-defined threshold. This can be particularly useful for finding correspondence points with respect to the chin/forehead.

In another example, the mesh constructor component 210 can establish a line from a vertex point on the PCA model in the normal direction, and correspondence can be identified with respect to the three-dimensional point cloud. Subsequently, an angle between the vertex normal and normal of correspondence point on point cloud can be analyzed: if the angle is larger than a pre-defined threshold, the vertex can be ignored; otherwise, the vertex point can be used to establish a point of correspondence. This approach may be particularly useful for finding correspondence points with respect to the nose, lips, and cheeks.

In still yet another example, the mesh constructor component 210 can select a vertex point on the PCA model and find a nearest point in the three-dimensional point cloud. Such approach can be particularly useful for finding correspondence points with respect to portions of the head/face other than those mentioned above.

The mesh constructor component 210 can additionally use two-dimensional facial feature information during PCA model construction. Since the two-dimensional feature points provide accurate facial feature position in most cases, such feature points can be used to constrain PCA model construction as follows:

$$E(\alpha) = \min_\alpha (\Sigma(\|S_F - S'\|^2) + \rho \Sigma_{i=1}^k \alpha_i / \sigma_i + \beta_i (\|W(S_F) - F'\|^2)), \quad (4)$$

where $S_F$ is a set of vertices selected from a generated model which represents the facial feature positions of the user 108, W( ) is the mapping function that maps the model to a two-dimensional color image, F' are target feature points in two-dimensional coordinates, $\beta_i$ is the weight for the ith feature point, wherein different weights can be provided for different features. For example, nose and eye center can be provided higher weight since they are relatively accurate and typically rigid for most users regardless of user expression, while a mouth feature would be provided with lower weight since positions can change as user expression changes, even if the identification of the feature is accurate. Similarly, cheek contour may be provided a still lower weight (or even ignored) since it may be difficult to obtain cheek contour with sufficient accuracy. The mesh constructor component 210 can execute PCA deformation multiple times to obtain suitable results.

In an exemplary embodiment, an iterative approach can be employed in addition to an ICP algorithm to estimate the rigid transformation between accumulated depth data and last step PCA result. The PCA basis can be converted with such updated information, and the PCA model can be analyzed again using such updated basis. This iterative approach may improve the PCA results accuracy, and can cease when E(α) is smaller than a pre-defined threshold.

In another example, aa rigid transformation can be estimated together with PCA fitting as follows:

$$E(\alpha, R) = \min_{\alpha, R} (\Sigma(\|R(S_F) - S'\|^2) + \rho \Sigma_{i=1}^k \alpha_i / \sigma_i + \Sigma_{i=1}^p \beta_i (\|W(R(S_F)) - F'\|^2)), \quad (5)$$

where R( ) is the rigid transformation matrix.

The mesh constructor component 210 can additionally employ Laplacian deformation on the PCA generated model to generate a still more accurate three-dimensional mesh. For example, the linear combination approach described above with respect to the PCA model can accurately describe most overall shapes, such as cheek shape, fat level in the face, and the like, as well as middle scale features, such as cheek bone height and mouth shape. For detailed features, however, such as nasolabial folds, a linear model may fail to accurately represent such features. Thus, the mesh constructor component 210 can employ Laplacian deformation on the PCA generated model to fit the target to the input accumulation depth data.

The mesh constructor component 210 can use vertices on the frontal faces as three-dimensional constraints for deformation, and weighted two-dimensional feature points mapping can be used as a two-dimensional constraint for deformation. Such constraints can work together to obtain final deformation results. Meanwhile, facial feature point information can be used to segment the head into several regions, and regional weight can be given to three-dimensional vertices as a position constraint. The region which is more rigid for people and has less accumulation error would be provided with a higher weight, while a region which is more non-rigid and has more accumulation error would be provided with lower weight, such as the mouth. The output of the mesh constructor component 210 is a relatively accurate three-dimensional triangular mesh of the head/face of the user 108.

Once the three-dimensional mesh has been generated of the head/face of the user 108, texture is to be applied to such three-dimensional mesh. Generally, texture is based on the RGB frames 202 captured by the camera 104, wherein synthesis can be employed to determine texture for portions of the head/face of the user 108 not captured in the images/frames 202. To utilize an input RGB image as a source of texture, the input color frames are aligned correctly with the three-dimensional mesh generated by the mesh constructor component 210. As mentioned above, the three-dimensional mesh is aligned with the first depth frame, and the rigid transformation is generated from each frame to the first frame, which means that the head model can be mapped to the correct pose for each frame that has been captured and utilized for mapping color to the mesh.

With more detail relating to texturing the three-dimensional mesh, the model generator component 112 can comprise an image preprocessor component 212, which can employ a variety of preprocessing techniques to improve collective quality of the RGB frames 202. For instance, the camera 104 may be a commodity camera that outputs relatively low resolution images. Additionally, quality of images captured by the camera 104 can be affected by lighting conditions and may be, in general, relatively noisy. Further, in some cases, insufficient light may be on the head/face of the user 108, and noise pertaining to color of the skin and/or other features of the user may exist in the RGB frames 202. The image preprocessor component 212 can utilize adaptive exposure adjustment techniques as well as noise reduction to improve image quality.

In connection with exposure adjustment, the image preprocessor component 212 can analyze an input color image and estimate current exposure distribution. Subsequently, a nonlinear transform can be applied by the image preprocessor component 212 to cause the major color pixels inside an RGB frame to be converted to an appropriate exposure level. In connection with noise reduction, the image preprocessor component 212 can analyze the edge of an input RGB frame in luminance space and color space separately. This can allow for the computation of a noise level, and the image preprocessor component 212 can employ region-based smoothing in the two spaces separately.

The model generator component 112 further comprises a texturizer component 214 that receives the processed RGB frames from the image preprocessor component 212. The texturizer component 214 can estimate color of the skin of the user 108 through texture synthesis. With more particularity, the texturizer component 214 can select portions of RGB frames 202 that are separate from the features identified by the face tracker component 206 (features on the front of the face of the user 108 other than the eye, eyebrow, mouth). Pixels in portions of the face other than that which correspond to the identified features can then be clustered by the texturizer component 214 through a K-means approach into five separate categories, and the average color can be calculated for such categories. Utilization of clustering by the texturizer component 214 can facilitate removal of interference caused by excess light, as well as specular and shadow portions of images.

The texturizer component 214 can additionally receive the three-dimensional mesh output by the mesh constructor component 210 to apply texture to such mesh. With more detail, the texturizer component 214 can cause a cylinder coordinate system to be set up around the three-dimensional mesh. A center point of the head can be the origin of the cylinder coordinate system, wherein the underside of the cylinder is parallel to the Y-plane of the three-dimensional mesh. The texturizer component 214 can map each triangle of the three-dimensional mesh onto the cylinder flank. Since the mapping from the three-dimensional mesh triangles to original input color frames already exists, color image frames can be converted to the flank texture.

Further, when the user 108 has depth and RGB images captured in three different positions (facing the left, looking forward, facing to the right), three frames with different views can be selected and mapped to same cylinder texture coordinates, and alpha blending can be applied to combine such three textures. The left view and right view can be used by the texturizer component 214 to supply texture information for cheeks. Further, the texturizer component 214 can employ two masks during the texturizing process. One mask can be used to set a texture mapping boundary, with the assumption that vertices exceeding that boundary are not visible on current views. The other mask can be for the three view embodiment where textures are blended, and can define the frontal view visible boundary. Both of such masks can be predefined in the three-dimensional wire mesh topology.

A variable that can be considered by the texturizer component 214 when applying texture to the three-dimensional mesh is forehead position. As some users have hair on the forehead, which causes noise to appear in a finalized texture, the variable forehead position can be exposed such that the user could adjust the forehead position to remove the hair interference. Further, the texturizer component 214 can receive input from the user 108 to refine color if desired. Using the known mappings, the texturizer component 214 can map appropriate colors to positions in the three-dimensional mesh generated by the mesh constructor component 210. Additionally, the texturizer component 214 can utilize synthesis techniques for parts of the head/face of the user 108 not captured in RGB images. This can be accomplished through utilization of skin color estimation to fill in parts which do not have texture information, then performance of Poisson filtering to smooth the boundary portion of the texture.

The model generator component 112 may optionally comprise a texture smoother component 216 that can decrease the realism in the resultant three-dimensional model. This may be desirable, as defining texture for hair is difficult and oftentimes hair applied to the three-dimensional model will be cartoonish in appearance. Thus, to provide a consistent look and feel to the resultant three-dimensional model, the texture smoother component 216 can selectively smooth the texture over the head/face of the user 108 resulting in an aesthetically consistent three-dimensional model.

The model generator component 112 may also comprise a hair generator component 217, which generates hair for application to the three-dimensional mesh generated by the mesh constructor component 210. The hair generator component 217 receives processed images from the image preprocessor component 212, as well as texture information from the texturizer component 214, and can select a model of hair to be applied to the three-dimensional mesh. For example, the hair generator component 217 can select a hairstyle from amongst a plurality of templates, wherein the hairstyle can be selected based upon general shape of the head of the user 108 and determined color of the hair of the user (as well as size of the hair of the user 108).

A renderer component 218 may optionally be included in the model generator component 112, wherein the renderer component 218 receives the three-dimensional mesh from the mesh constructor component 210, smooth texture from the texture smoother component 216 to be applied to the three-dimensional mesh, and hair selected by the hair generator component 214, and outputs a rendering of the three-dimensional model of the head/face of the user 108. Alternatively, the renderer component 218 can cause the three-dimensional model to be stored in a data repository in a format ready for rendering.

Figure 3:
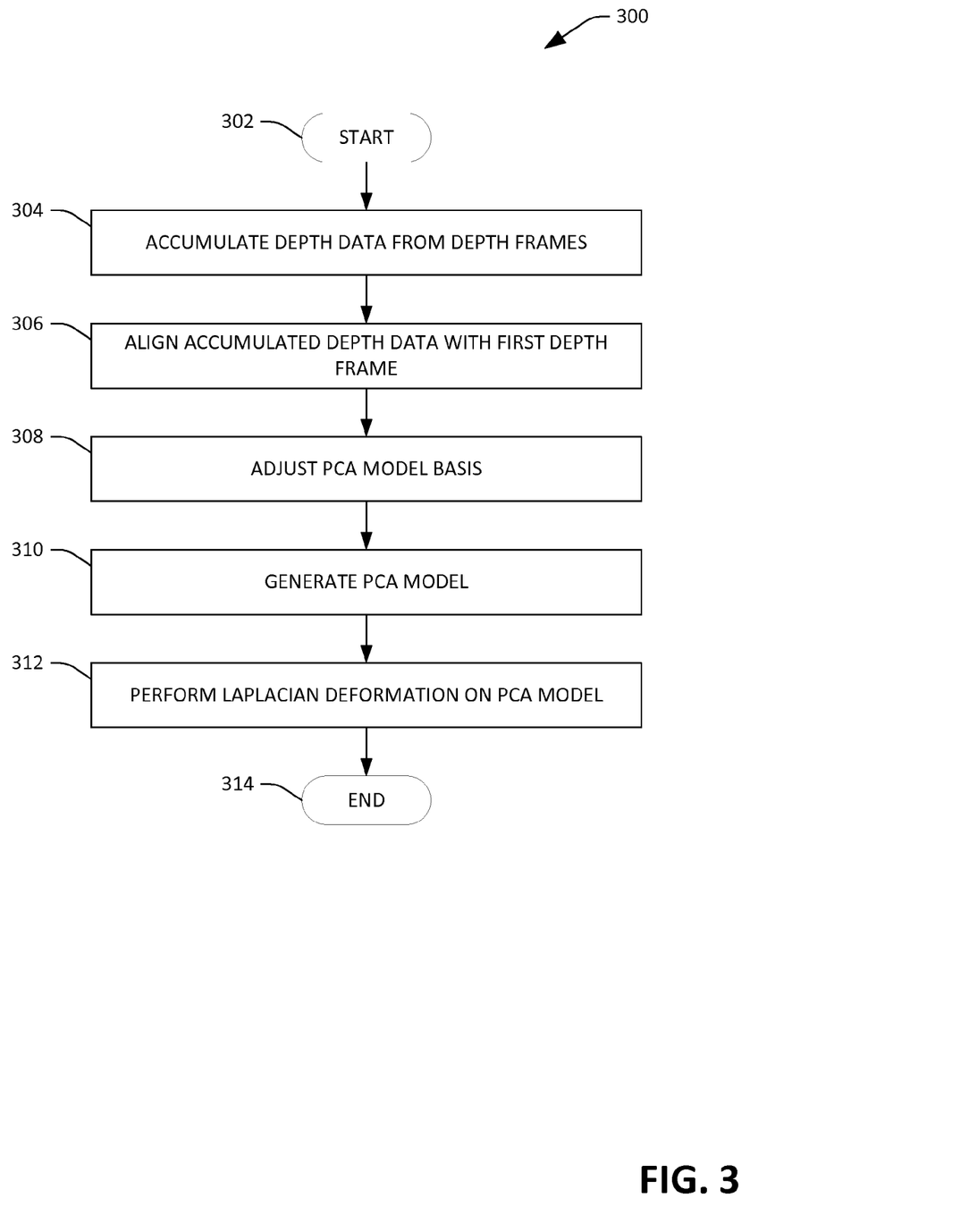
FIG. 3 is a flow diagram that illustrates an exemplary methodology for constructing a virtual three-dimensional mesh of a head/face of a user.
Figure 4:
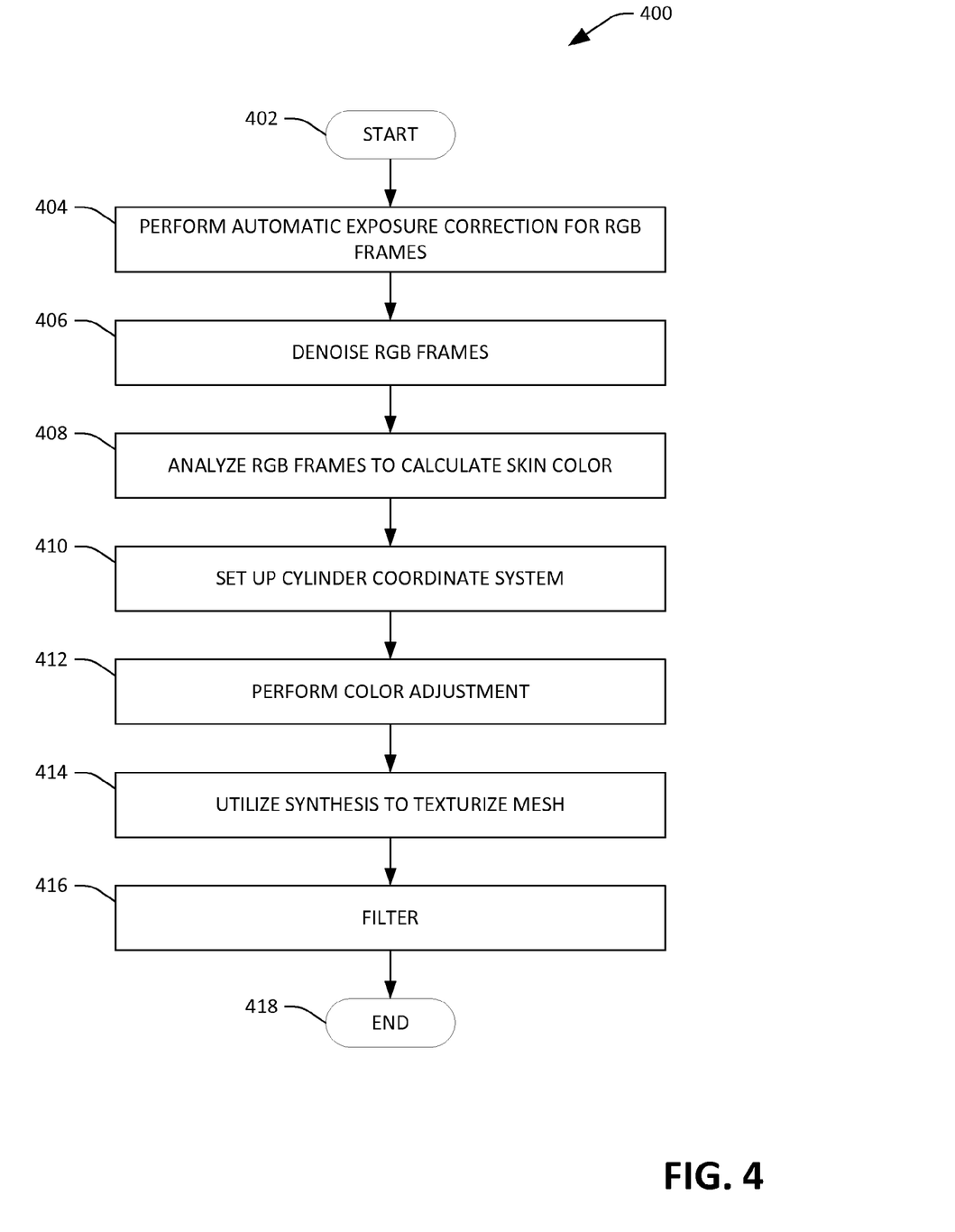
FIG. 4 is a flow diagram that illustrates an exemplary methodology for generating a texture map that is representative of facial texture of a user.
Figure 5:
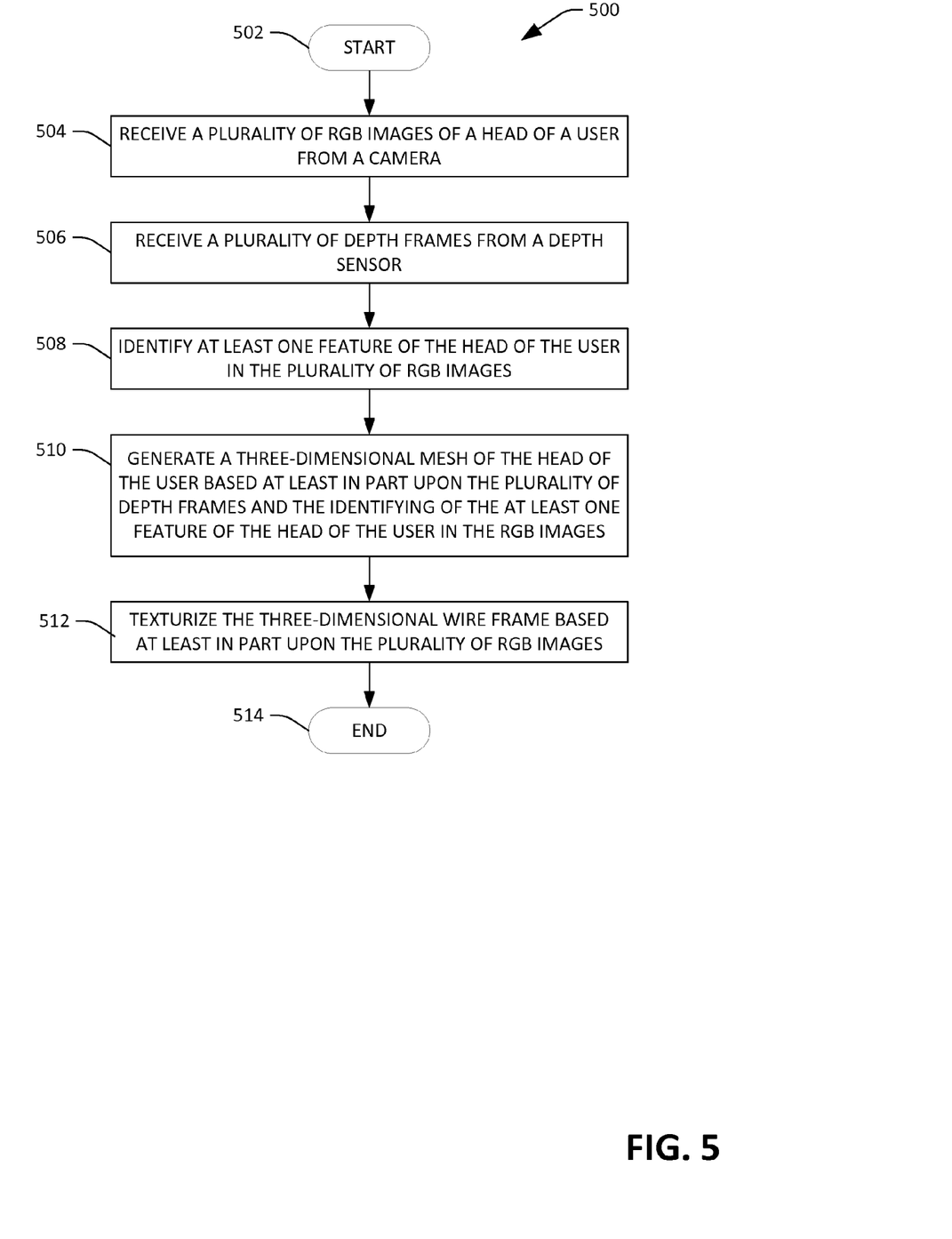
FIG. 5 is a flow diagram illustrating an exemplary methodology for constructing a relatively accurate virtual three-dimensional model of a head/face of a user.

With reference now to FIGS. 3-5, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagating signal.

Now referring to FIG. 3, a flow diagram that illustrates an exemplary methodology for generating the three-dimensional mesh of the head/face of the user 108 is illustrated. The methodology 300 starts at 302, and at 304 depth data is accumulated. As described above, accumulation includes frame alignment between depth frames, wherein an ICP algorithm is employed in connection with frame alignment. Additionally, facial feature points identified by a face tracking algorithm can be used to calculate a rough rigid transformation between depth frames, wherein such rigid transformation can be used as an initial value for the ICP algorithm. At 306, accumulated depth frames are aligned with the first frame. Again, for utilization of an ICP algorithm for the above-mentioned three view mode, frames on three views can be accumulated separately at 304 and three accumulated results can be aligned and combined with alpha blending.

At 308, a PCA model basis is adjusted. A rough rigid transformation between pre-computed PCA mean model and the accumulated depth data can be calculated and utilized to convert the PCA basis to depth space.

At 310, a PCA model of the head/face of the user 108 can be generated. PCA model construction has been described above.

At 312, a Laplacian deformation can be undertaken on the generated PCA model. Laplacian deformation can be utilized to more accurately represent portions of the head/face of the user 108. The methodology 300 completes at 314.

Now referring to FIG. 4, an exemplary methodology 400 that facilitates applying textures to a three-dimensional mesh of a face/head of the user is illustrated. The methodology 400 starts at 402, and at 404 RGB images are subjected to an automatic exposure correction process. At 406, the RGB images are subjected to de-noising, and at 408 the process images are analyzed for a skin color calculation. As noted above, this skin color calculation can be based upon portions of the face of the user 108 that do not correspond to certain identified features.

At 410, a cylinder coordinate system is set up around the three-dimensional mesh of the head for the purposes of cylinder texture generation. At 412, the optional step of color adjustment may be undertaken with the aid of input from a user, and at 414, synthesis can be undertaken to uniformly apply texture across portions of the head/face of the user 108 not captured in the RGB frames. At 416, filtering can optionally be undertaken to provide the resultant three-dimensional model of the head/face of the user with a consistent appearance in comparison to, for example, hair of the user. The methodology 400 completed 418.

Now referring to FIG. 5, an exemplary methodology 500 that facilitates generating a relatively accurate three-dimensional model of a head/face of a user is illustrated. The methodology 500 starts at 502, and a 504 a plurality of RGB images of a head of a user are received from a camera, wherein the plurality of RGB images are captured by the camera over some range of time. At 506, a plurality of depth frames are received from a depth sensor, wherein the depth frames are indicative of distances of respective portions of the head of the user from the depths sensor. The depth frames are generated by the depths sensors over the range of time. Additionally, the plurality of RGB images and the plurality of depth frames can be synchronized in time. At 508, at least one feature of the head of the user in the plurality of RGB images is identified, wherein the at least one feature is one of a center of an eye of the user, a center of a nose of the user, a first nasal alar are of the user, or a second nasal alar of the user.

At 510, a three-dimensional mesh of the head of the user is generated based at least in part upon the plurality of depth maps and the identifying of the at least one feature of the head of the user and the RGB images. At 512, the three-dimensional mesh is texturized based at least in part upon the plurality of RGB images. The methodology 500 completes at 514.

Figure 6:
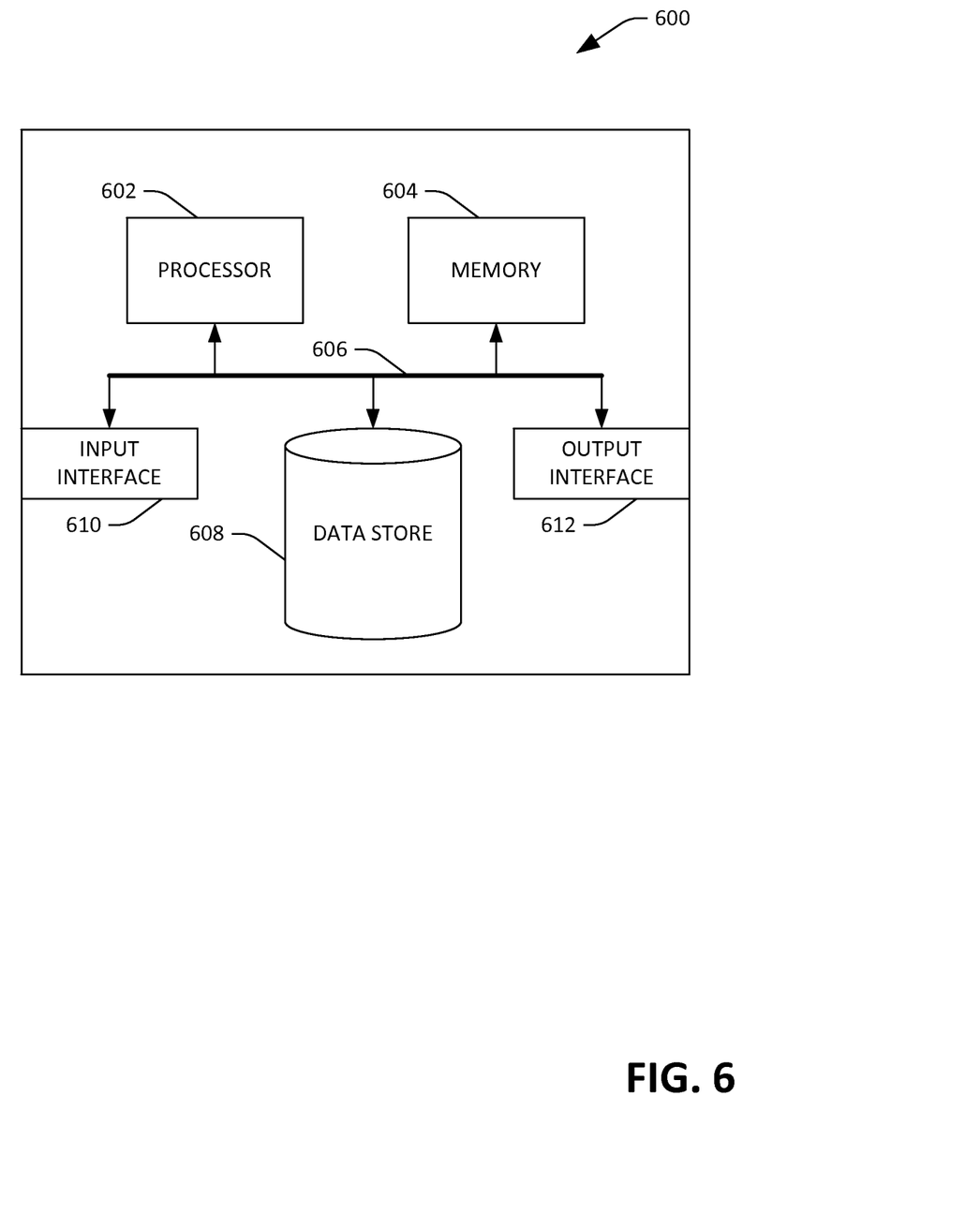
FIG. 6 is an exemplary computing system.

Now referring to FIG. 6, a high-level illustration of an exemplary computing device 600 that can be used in accordance with the systems and methodologies disclosed herein is illustrated. For instance, the computing device 600 may be used in a system that supports generating a virtual three-dimensional model of a head/face of a user. computing device 600 includes at least one processor 602 that executes instructions that are stored in a memory 604. The memory 604 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store feature points, a transformation matrix, RGB frames, depth frames, etc.

The computing device 600 additionally includes a data store 608 that is accessible by the processor 602 by way of the system bus 606. The data store may be or include any suitable computer-readable storage, including a hard disk, memory, etc. The data store 608 may include executable instructions, RGB frames, depth frames, identified feature points, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method that facilitates constructing a computer-implemented three-dimensional representation of a head of a user, the method comprising:

receiving a plurality of red-green-blue (RGB) frames of the head of the user from a camera, the plurality of RGB frames captured by the camera over a range of time;

receiving a plurality of depth frames from a depth sensor, the depth frames being indicative of distances of respective portions of the head of the user from the depth sensor, the depth frames generated by the depth sensor over the range of time, wherein orientation of the head of the user relative to the camera and the depth sensor changes during the range of time;

identifying a feature of the head of the user in the plurality of RGB frames, the feature being one of a center of an eye of the user, a center of a nose of the user, a first nasal alar of the user, or a second nasal alar of the user;

aligning the plurality of depth frames with one another based upon the feature of the head of the user identified in the plurality of RGB frames;

in response to aligning the plurality of depth frames with one another, computing a three-dimensional point cloud based upon the plurality of depth frames being aligned with one another;

generating a three-dimensional mesh of the head of the user based upon the three-dimensional point cloud; and texturizing the three-dimensional mesh based upon the plurality of RGB frames.

2. The method of claim 1, wherein a sensor housing comprises both the camera and the depth sensor.

3. The method of claim 1, wherein resolution of the RGB frames is less than 1280 pixels in length and 960 pixels in height.

4. The method of claim 1, wherein resolution of the depth frames is less than 1280 pixels in length by 960 pixels in height.

5. The method of claim 1, wherein the plurality of RGB frames and the plurality of depth frames are captured when the head of the user is stationary.

6. The method of claim 1, wherein the plurality of RGB frames and the plurality of depth frames are captured as the head of the user is rotated.

7. The method of claim 1, further comprising:

responsive to receiving at least one RGB frame from the plurality of RGB frames and at least one depth frame from the plurality of depth frames, estimating a three-dimensional pose of the head of the user; and outputting an instruction to the user based at least in part upon the estimating of the three-dimensional pose of the head of the user.

8. The method of claim 1, further comprising automatically animating the three-dimensional model of the user subsequent to texturizing the three-dimensional mesh.

9. The method of claim 1, further comprising:

subsequent to receiving the plurality of depth frames from the depth sensor, selecting a PCA basis model; and morphing the PCA basis model based upon the three-dimensional point cloud.

10. The method of claim 1, wherein texturizing the three-dimensional mesh based upon the plurality of RGB frames comprises:

estimating skin color of the user in the RGB frames; and texturing the three-dimensional mesh to include the estimated skin color.

11. The method of claim 1, wherein aligning the plurality of depth frames with one another comprises:

for each depth frame, computing values of coordinates in a three-dimensional coordinate system based upon a location of the feature in a synchronously captured RGB frame; and aligning the depth frames with one another based upon the computed values of the coordinates.

12. A system, comprising:

a processor; and memory that comprises instructions that, when executed by the processor, cause the processor to perform acts comprising:

receiving a plurality of RGB frames captured by a RGB camera over a range of time, each RGB frame in the plurality of RGB frames comprising an image of a head of a user;

receiving a plurality of depth frames captured by a depth sensor over the range of time, each depth frame in the plurality of depth frames comprising a depth map of the head of the user, wherein the plurality of RGB frames and the plurality of depth frames are captured when the head of the user is at different orientations relative to the RGB camera and the depth sensor;

identifying facial features of the user in the plurality of RGB frames;

aligning depth frames in the plurality of depth frames with one another based upon the facial features of the user identified in the plurality of RGB frames; and generating an animated three-dimensional model of the head of the user based upon the depth frames that are in alignment with one another.

13. The system of claim 12 comprised by a gaming console.

14. The system of claim 12, wherein the processor, the memory, the RGB camera, and the depth sensor are comprised by a personal computing device.

15. The system of claim 12, wherein the facial features comprise at least one of a center of an eye of the user, a center of a nose of the user, a first nasal alar of the user, or a second nasal alar of the user, wherein generating the three-dimensional model of the head of the user comprises:

selecting a template wire mesh that is representative of a three-dimensional head based upon the plurality of depth frames; and modifying the template wire mesh based upon the identified facial features of the user.

16. The system of claim 12, wherein generating the three-dimensional model of the head of the user comprises:

filtering noise from each RGB frame in the plurality of RGB frames to generate processed RGB frames; and texturizing the three-dimensional model based upon the processed RGB frames.

17. The system of claim 12, wherein generating the three-dimensional model of the head of the user comprises selecting hair for placement on the animated three-dimensional model.

18. The system of claim 17, wherein generating the three-dimensional model of the head of the user comprises smoothing texture across the animated three-dimensional model.

19. The system of claim 12 comprised by a mobile computing device.

20. A computer-readable medium comprising instructions that, when executed by a processor, cause the processor to perform acts comprising:

receiving a plurality of RGB frames from an RGB camera over a range of time, the RGB frames capturing a head of a user;

receiving a plurality of depth frames from a depth sensor over the range of time, the depth frames capturing the head of the user, wherein the plurality of RGB frames and the plurality of depth frames are generated by the RGB camera and the depth sensor, respectively, as the head of the user is in motion during the range of time;

identifying a feature of the user in the plurality of RGB frames, the feature being a center of an eye of the user, a center of a nose of the user, a first nasal alar of the user, or a second nasal alar of the user;

for each depth frame in the plurality of depth frames, computing coordinate values of the feature based upon locations of the feature in corresponding RGB frames, the coordinate values are in a three-dimensional coordinate system;

aligning the depth frames with one another based upon the coordinate values of the feature computed for each of the depth frames;
generating a three-dimensional point cloud corresponding to the head of the user based upon the aligning of the depth frames with one another;
selecting a template head model from a library of template head models based upon the three-dimensional point cloud;
refining the head model based upon the feature of the user in the plurality of RGB frames; and
subsequent to refining the head model, texturing the head model based upon the plurality of RGB frames.

* * * * *